United States Patent [19]

Abe et al.

[11] 4,347,596

[45] Aug. 31, 1982

[54] DISC PLAYER APPARATUS

[75] Inventors: Kunio Abe; Masatsugu Saito; Masao Ono; Yuji Ikedo, all of Tokorozawa, Japan

[73] Assignee: Pioneer Electronic Corporation, Tokyo, Japan

[21] Appl. No.: 223,617

[22] Filed: Jan. 9, 1981

[30] Foreign Application Priority Data

| Jan. 11, 1980 [JP] | Japan | 55-1897 |
| Jan. 11, 1980 [JP] | Japan | 55-1899 |
| Jan. 11, 1980 [JP] | Japan | 55-1901 |

[51] Int. Cl.³ .................... G11B 1/00; G11B 25/04
[52] U.S. Cl. ............................. 369/72; 369/265; 369/77
[58] Field of Search ............... 369/72, 77, 194, 63, 369/265, 191

[56] References Cited

U.S. PATENT DOCUMENTS

| 1,465,909 | 8/1923 | Infante | 369/194 |
| 1,906,620 | 5/1933 | Knight et al. | 369/270 |
| 3,264,003 | 8/1966 | Thevenaz | 369/191 |
| 3,799,556 | 3/1974 | Watanabe | 369/63 |
| 4,078,807 | 3/1978 | Sherwood | 369/63 |

Primary Examiner—Steven L. Stephan
Attorney, Agent, or Firm—Griffin, Branigan & Butler

[57] ABSTRACT

A disc player apparatus which features, inter alia, a disc and drive support structure including a turntable having a lower face adapted to receive thereon the disc to be played back and a lower disc support unit which is movable into and out of a position below the turn table for holding the disc between the turn table and the disc support unit.

17 Claims, 9 Drawing Figures

DISC PLAYER APPARATUS

FIELD OF THE INVENTION

The present invention relates to a recording disc player apparatus for playing back an audio and/or video recording disc.

BACKGROUND OF THE INVENTION

A known disc player apparatus uses a disc holding mechanism in which the recording disc to be played back is held between a turntable and a disc holder adapted to receive an apertured central portion of the disc. The disc holder is directly connected to the casing structure of the player apparatus. If, therefore, mechanical vibrations are applied to the casing, the vibrations are transmitted to the disc holder and accordingly to the disc per se without being dampened out. This causes serious deterioration of the quality of the signals reproduced by the player apparatus during operation.

Among the known disc player apparatuses of the above described type are an apparatus which further uses an automatic disc loading mechanism for automatically loading the player apparatus with the disc to be played back. A drawback has been encountered in a disc player apparatus of this nature in that a disproportionately large space is required for the accommodation of the movement of the automatic disc loading mechanism into and out of the position in which the disc carried by the mechanism is ready for playback operation.

In a disc player apparatus provided with such an automatic disc loading mechanism, furthermore, the disc is held in position on the disc loading mechanism by applying forces to the disc in radial directions of the disc during transfer of the disc into and out of the position ready for playback operation. If, in this instance, the disc holder is of the spring-loaded type, excessive forces may be applied to the disc held in position by the disc holder because the discs to be put to use usually vary in size from one another due to the difference between the types of the disc or to errors in the fabrication of the discs.

In a prior-art disc player apparatus of the type using an automatic disc loading mechanism, furthermore, an extreme difficulty is encountered for correctly positioning the disc with respect to the spindle of the turntable when the disc is to be moved into the operative position on the turntable.

If the automatic disc loading mechanism is of the type which is adapted to support the disc over the entire surface of the disc, the disc loading mechanism has members and portion which are to protrude out of the casing of the player apparatus when the player apparatus is in operation. These members and portions tend to deteriorate the stability of the total structure and weight of the player apparatus.

A known disc player apparatus using an automatic disc loading mechanism further includes an automatic arm drive device adapted to automatically drive the pickup arm of the player apparatus into and out of the rest position of the arm during lead-in and return motions of the arm. Such an arm drive device is electrically actuated by means of a manually operated switch which is usually mounted on an external panel member attached to the casing of the player apparatus. Thus, two manipulative steps are required to start a playback operation with such a disc player apparatus, consisting of the step to convey the disc to be played back into the player apparatus by means of the above mentioned automatic disc loading mechanism and the subsequent step for pressing the switch for the arm drive device. The switch for the automatic arm drive device is provided independently of the switch for connecting the player apparatus to a power source, requiring provision of two switches for the player apparatus. Provision of such two switches, in turn, requires not only two manipulative steps to press the switches but gives rise to an increase in the production cost of the player apparatus since each of such switches is usually considerably expensive.

On the other hand, it is an ordinary practice for a user of a disc player apparatus to clean the surface of the disc to be played back. Extremely elaborate efforts are, however, necessitated for cleaning recording discs as is well known to users of disc players. In a disc player apparatus of the above described type having an automatic disc loading mechanism furthermore, extreme difficulties are encountered if it is desired to have a disc cleaned once the disc is mounted on the turntable of the player apparatus.

A disc player apparatus is known which is provided with cleaning means capable of cleaning the disc mounted on the turntable of the player apparatus. Such cleaning means is, however, constructed in such a manner as to be held in contact with the disc being played back. The pressure thus throughout playback operation not only deteriorates the signal-to-noise characteristic of the playback operation but imposes an additional load on the motor for driving the turntable.

The present invention contemplates provision of a disc player apparatus which will overcome each of the above described drawbacks which have thus far been inherent or involved in prior-art disc player apparatuses.

SUMMARY OF THE INVENTION

In accordance with the present invention, there is provided a disc player apparatus which comprises a base plate, a plurality of support members upstanding from the base plate, elastic support element respectively mounted on the support members, a disc and drive support structure including a turntable for holding thereto a disc to be played back, the support structure being supported in weight transmitting relationship on said support members through the elastic support elements, a carriage plate movable into and out of a position below the support structure, and a lower disc support unit movable with the carriage plate and including an elastic support element, the lower disc support unit being supported on the carriage plate through the elastic support element of the unit.

BRIEF DESCRIPTION OF THE DRAWINGS

The features and advantages of a disc player apparatus according to the present invention will be more clearly understood from the following description taken in conjunction with the accompanying drawings, in which.

DESCRIPTION OF THE EMBODIMENT

Figure 1:
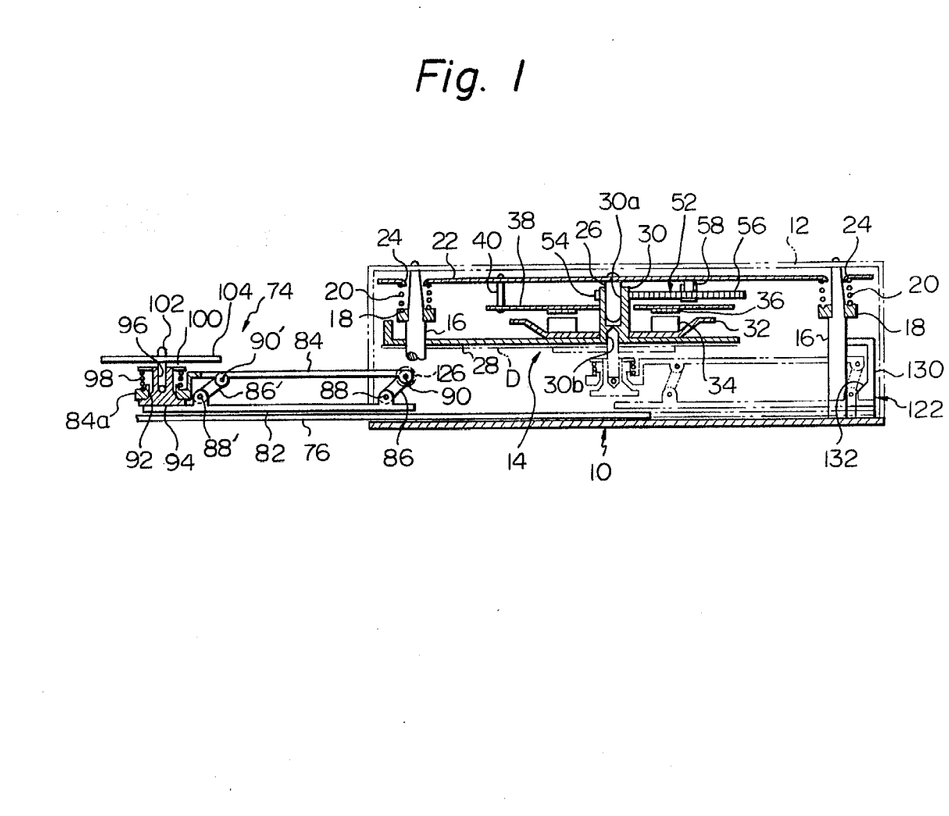
FIG. 1 is a side elevation view showing, partially in vertical section, a preferred embodiment of the disc player apparatus according to the present invention.

Referring to the drawings, first concurrently to FIGS. 1 to 4 thereof, a disc player apparatus embodying the present invention is shown comprising a horizontal base plate 10 having a flat upper face and a generally box-shaped hollow casing 12 positioned on the base plate 10 as indicated by dots-and-dash lines in FIG. 1.

The horizontal base plate 10 has supported thereon a disc support and drive structure which is represented in its entirety by reference numeral 14 in FIG. 1. As shown in FIG. 1, the disc support and drive structure 14 comprises at least three stationary vertical posts 16 each secured at its lower end to the base plate 10 and perpendicularly upstanding from the upper face of the plate 10. The individual vertical posts 16 are located on the base plate 10 preferably in such a manner as to have a common vertical axis of symmetry with respect to which the posts 16 are arranged substantially in symmetry to one another. Each of the vertical posts 16 has an upper end portion which is tapered toward the extreme upper end thereof as illustrated in FIG. 1.

Furthermore, each of the vertical posts 16 has coaxially secured thereto an annular spring seat member 18 through which the tapered upper end portion of the post axially projects upwardly. A helical compression spring 20 is seated at one end thereof on the upper face of the spring seat member 18 on each of the posts 16 and is coaxially positioned around the tapered upper end portion of the post.

The disc support and drive structure 14 further comprises a horizontal player board 22 which is formed with openings 24 which are located respectively in correspondence with the vertical posts 16. The player board 22 has ring-shaped skirt edge portions each defining each of the openings 24 and slightly projecting downwardly from the lower face of the board 22 as shown. Each of the helical compression springs upstanding from the respective spring support members 18 on the individual posts 16 is seated at its upper end on the lower face of the player board 22 in such a manner that each spring is retained by each of the skirt edge portions of the board 22 as will be seen from FIG. 1. The player board 22 as a whole is, thus, elastically supported by the vertical posts 16 through the intermediary of the helical compression springs 20 pressing the board 22 upwardly above the base plate 10.

The individual helical compression springs 20 forming part of the above described disc and drive support structure 14 respectively serve as elastic support elements elastically supporting the player board 22 in weight transmitting relationship to the vertical posts 16 in the disc player apparatus according to the present invention. In the disc support and drive structure 14 shown in FIG. 1, each of the vertical posts 16 is shown axially projecting upwardly through each of the openings 24 in the player board 22 but may be modified to upwardly terminate below the associated one of the openings 24. As an alternative, the player board 22 may be blank throughout its area, viz., formed with no openings therein so that each of the vertical posts 16 has its upper end below the lower face of the player board, though not shown in the drawings.

A shaft 26 is secured to the player board 22 thus configured and arranged and axially projects downwardly from the lower face of the board 22. The shaft 26 is located on the player board in such a manner as to have a center axis substantially aligned or coincident with the above mentioned axis of symmetry among the posts 16. A circular turntable 28 having a hollow sleeve portion 30 is positioned between and substantially in parallel with the base plate 10 and the player board 22. The hollow sleeve portion 30 axially projects upwardly from the turntable 28 and has a center axis substantially coincident with the center axis of the turntable as a whole. The sleeve portion 30 of the turntable 28 is, furthermore, formed with an upper blind bore 30a which is axially open upwardly and a lower blind bore 30b which is axially open downwardly. The upper blind bore 30a is closed at its lower end and the lower blind bore 30b is closed at its upper end. The shaft 26 projecting downwardly from the player board 22 is received in the upper blind bore 30a in the sleeve portion 30 by means of a suitable bearing (not shown) so that the turntable 28 as a whole is rotatable about the center axis of the shaft 26 and is axially retained in position with respect to the player board 22.

The turntable 28 has securely attached to its upper face a magnet support disc member 32 having a central aperture through which the hollow sleeve portion 30 of the turntable 28 projects upwardly. The magnet support disc member 32 in turn has fixedly mounted on its upper face an annular magnet 34 which is positioned in substantially coaxial relationship to the sleeve portion 30 of the turntable 28. The magnet support disc member 32 and the magnet 34 mounted thereon thus constitute in combination a rotor unit which is rotatable with the turntable 28 about the center axis of the shaft 26 with respect to the base plate 10 and the player board 22.

Immediately above the annular magnet 34 is positioned a generally ring-shaped coil assembly 36 which is secured to the lower face of a coil support disc member 38 which is positioned between and substantially in parallel with the magnet support disc member 32 and the player board 22 as shown. The coil support disc member 38 is secured to the player board 22 by means of a suitable number of connector elements 40 each secured at one end to the player board and at the other to the coil support disc member 38. The coil support disc member 38 is formed with a central aperture through which the sleeve portion 30 of the turntable 28 is axially passed. The coil support disc member 38 has an inner peripheral edge radially spaced apart from the outer peripheral surface of the sleeve portion 30 of the turntable 28, which is therefore permitted to turn about the center axis of the shaft 26 without being contacted by the coil support disc member 38. The coil assembly 36 and the coil support disc member 38 constitute in combination a stator unit which is stationary with respect to the base plate 10 and the player board 22.

The rotor unit composed of the magnet support disc member 32 and the magnet 34 and the stator unit composed of the coil assembly 36 and the coil support disc member 38 constitute in combination drive means of the disc player apparatus embodying the present invention. The above described construction and arrangement of such drive means are, however, merely for illustrative purpose and, for this reason, the drive means which forms part of the disc player apparatus according to the present invention may be constructed and arranged in any other fashion if desired.

Figure 2:
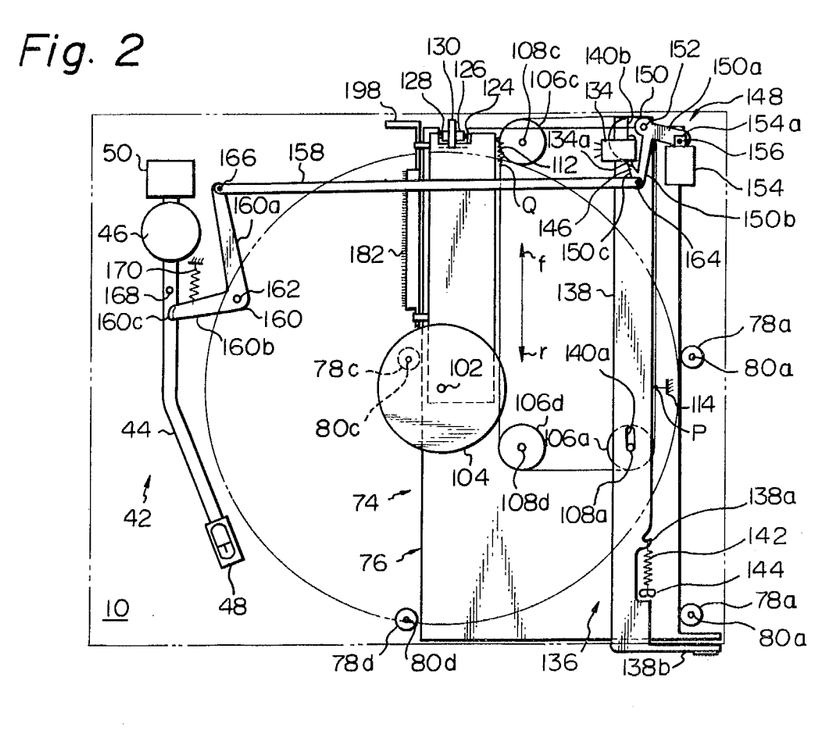
FIG. 2 is a schematic plan view of the disc player apparatus shown in FIG. 1, the disc player apparatus herein shown in a condition in which the disc to be played back is moved into a position ready for playback operation.
Figure 3:
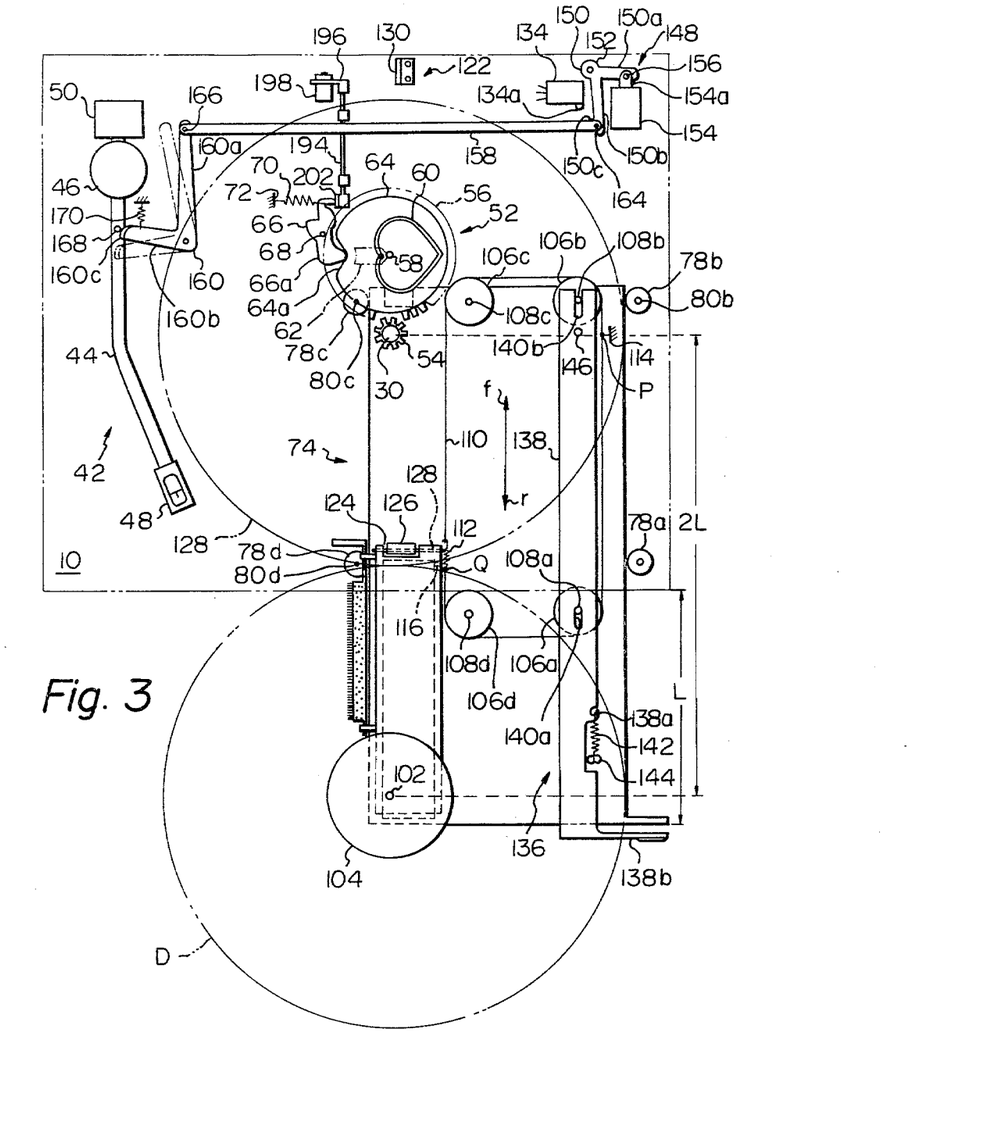
FIG. 3 is a view similar to FIG. 2 but shows the disc player apparatus in a condition in which the disc is located outside the casing of the player apparatus.

The disc player apparatus embodying the present invention further comprises a pickup assembly which is designated in its entirety by reference numeral 42 in FIGS. 2 and 3. The pickup assembly 42 as shown comprises a generally elongated or slightly dog-legged pickup arm 44 which is cantilevered to a fulcrum unit 46 which is supported on the base plate 10 and which is usually rotatable both about a vertical axis and about a horizontal axis with respect to the base plate 10. The pickup arm 44 has carried at its leading end a suitable pickup head such as for example a stylus cartridge 48 and at the other end thereof a counter weight 50 as is customary. The pickup arm 44 thus arranged is pivotally movable about the vertical axis of rotation of the fulcrum unit 46 from and back to its rest position shown in FIGS. 2 and 3 so that the stylus cartridge 48 carried on the arm 44 is movable in an arc toward and away from a downward extension of the center axis of the turntable 28.

Figure 4:
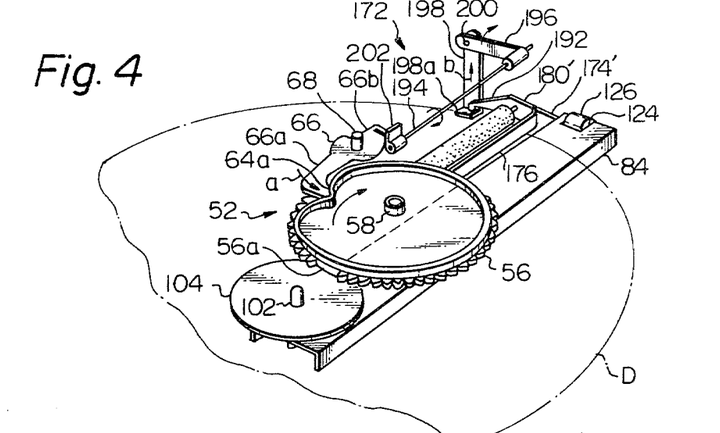
FIG. 4 is fragmentary perspective view showing part of an automatic arm drive mechanism and part of a disc cleaning mechanism of the disc player apparatus embodying the present invention.

The embodiment of the disc player apparatus herein shown is assumed, by way of example, to be of the automatic arm drive type and is therefore shown further comprising an automatic arm drive mechanism 52 which is partially shown in FIGS. 1, 3 and 4 of the drawings. The automatic drive mechanism 52 is adapted to automatically drive the pickup arm 44 to turn about the vertical axis of rotation of the fulcrum unit 46 into and out of the rest position shown in FIGS. 2 and 3 and is shown comprising a drive gear 54 coaxially secured to the sleeve portion 30 of the turntable 28 and positioned above the coil support disc member 38 and a driven gear 56 which is coaxially rotatable on a shaft 58 secured to the player board 22 and projecting downwardly from the lower face of the board 22 as will be best seen from FIG. 1. The driven gear 56 has a plain outer peripheral portion 56a void of gear teeth as seen in FIG. 4 and, thus, has about the center axis of the shaft 58 an angular position having its gear teeth in mesh with the drive gear 54 and an angular position having the plain outer peripheral portion directed toward the drive gear as shown in FIG. 4. When the drive gear 54 is in mesh with the driven gear 56, the rotation of the turntable 28 driven by the previously described drive means is transmitted through the sleeve portion 30 of the turntable 28 and the drive gear 54 to the driven gear 56 and causes the driven gear 56 to turn about the center axis of the shaft 58 until the driven gear 56 is turned into the angular position having the plain outer peripheral portion 56a directed toward the drive gear 54. When the driven gear 56 is held in the angular position having the plain outer peripheral portion 56a thus directed toward the drive gear 54, the drive gear 54 idles with respect to the driven gear 56 which is therefore permitted to stay at rest with respect to the base plate 10 and the player board 22.

The automatic arm drive mechanism 52 further comprise a generally cardioid-contoured arm drive cam member 60 secured to the driven gear 56, and a reciprocating cam follower member 62 which is held in slidable contact with the external cam surface of the arm drive cam member 60 as indicated by dot-and-dash lines in FIG. 3. Though not shown in the drawings, the reciprocating cam follower member 62 is mechanically connected to or linked with the pickup arm 44 directly or by means of a suitable mechanical linkage (not shown). Each time the arm drive cam member 60 is driven to make a single full turn about the center axis of the shaft 58, the cam follower member 62 is caused to linearly move back and forth with respect to the shaft 58 and thereby drives the pickup arm 44 to turn about the vertical axis of rotation of the fulcrum unit 46 from and back to the rest position thereof with respect to the base plate 10, producing a lead-in or return motion prior to the starting of a playback operation or upon completion of the playback operation.

The automatic arm drive mechanism 52 of the apparatus embodying the present invention further comprises locking means operative to hold the driven gear 56, arm drive cam member 60, a cam follower member 62 in locked positions when the arm drive mechanism 52 is maintained in an inoperative condition. In FIGS. 3 and 4 of the drawings, such locking means is shown comprising a generally circular lock control cam member 64 having a concavely curved cam lobe portion 64a. The lock control cam member 64 is coaxially secured to the driven gear 56 and is accordingly rotatable together with the driven gear 56 and the arm drive cam member 60 about the center axis of the shaft 58. The locking means of the automatic arm drive mechanism 52 further comprises a locking lever 66 located horizontally in the neighborhood of the lock control cam member 64 and rotatably mounted on a shaft 68 secured to the player board 22 and axially projecting downwardly from the lower face of the player board 22. The locking lever 66 is thus rotatable about the center axis of the shaft 68 substantially parallel with the axis of rotation of the lock control cam member 64 and has a first arm portion 66a engageable with the peripheral cam surface of the cam member 64 and a second arm portion 66b directed substantially opposite to the first arm portion 66a across the shaft 68. The locking lever 66 thus configured and arranged is urged by suitable biasing means to turn about the center axis of the shaft 68 in a direction indicated by arrow a in FIG. 4, viz., in a direction in which the first arm portion 66a is elastically pressed against the cam surface of the lock control cam member 64. In FIG. 3 of the drawings, such biasing means is shown, by way of example, as comprising a preloaded helical tension spring 70 which is anchored at one end to the second arm portion 66b of the locking lever 66 and at the other end to a suitable stationary member 72 secured to the player board 22. When the automatic arm drive mechanism 52 is maintained in an inoperative condition, the lock control cam member 64 assumes about the center axis of the shaft 58 a predetermined angular position having its concavely curved cam lobe portion 66a received by the first arm portion 66a of the locking lever 66 as shown in FIG. 3. The lock control cam member 64 is attached to the driven gear 56 in such a manner that the previously mentioned plain outer peripheral portion 56a of the gear 56 is directed toward the drive gear 54 on the shaft 26 when the lock control cam member 64 is held in the above mentioned angular position thereof with respect to the locking lever 66, as will be seen from FIG. 4.

In the disc player apparatus according to the present invention, an audio or video disc to be played back in the player apparatus is attached to the lower face of the turntable 28 of the previously described disc and drive support structure 14. Prior to or upon completion of a playback operation with the audio or video disc, therefore, the disc is carried into or out of a predetermined "ready-for-loading" position on the lower face of the turntable 28. The audio or video disc to be played back is carried into or out of such a position in a fore-and-aft direction of the player apparatus. More specifically, the disc to be played back is carried into the ready-for-loading position in a forward or "disc loading" direction indicated by arrow f in each of FIGS. 1 to 3 and is carried back out of the ready-for-loading position in a rearward or "disc unloading" direction which is indicated by arrow r in each of FIGS. 1 to 3. In each of FIGS. 2, 3 and 4, furthermore, the audio or video disc to be played back in the apparatus embodying the present invention is schematically indicated by a circular phantom line and is represented by character D.

Thus, the disc player apparatus embodying the present invention further comprises a disc carrier mechanism 74 adapted to carry the audio or video disc D into and out of the above mentioned ready-for-loading position. In FIGS. 1 to 3 of the drawings, the disc carrier mechanism 74 is shown comprising a lower or main slider plate 76 which is longitudinally slidable on the flat upper face of the base plate 10 in a direction parallel with the above mentioned fore-and-aft direction of the player apparatus. The lower slider plate 76 has a substantially flat horizontal upper face and substantially straight side faces longitudinally extending substantially in parallel with the fore-and-aft direction of the player apparatus as will be seen from FIGS. 2 and 3.

To guide the main slider plate 76 to slide on the base plate 10 in the above mentioned disc loading and unloading directions f and r, the disc carrier mechanism 74 further comprises guide means. In FIGS. 2 and 3, such guide means is shown comprising four guide rollers which consist of a pair of guide rollers 78a and 78b positioned adjacent one side of the slider plate 76 and a pair of guide rollers 78c and 78d positioned adjacent the other side of the slider plate 76. The rollers 78a, 78b, 78c and 78d are rotably mounted on shafts 80a, 80b, 80c and 80d, respectively, each perpendicularly upstanding from the upper face of the base plate 10. The guide rollers 78a and 78b are held in rollable contact with one side face of the slider plate 76 and, likewise, the guide rollers 78c and 78d are held in rollable contact with the other side face of the slider plate 76.

The disc carrier mechanism 74 further comprises an upper or auxiliary slider plate 82 which is indicated by full lines in FIG. 1 and broken lines in FIG. 3. The auxiliary slider plate 82 is longitudinally slidable on the flat upper face of the lower or main slider plate 76 also in a direction parallel with the fore-and-aft direction of the player apparatus.

The auxiliary slider plate 82 forms part of a parallel motion structure which further comprises a carriage plate 84 positioned above and substantially in parallel with the auxiliary slider plate 82 and having a downwardly stepped rear ledge portion 84a as shown in FIG. 1. The auxiliary slider plate 82 and the carriage plate 84 are connected together by four link members which consist of a pair of front link members 86 and a pair of rear link members 86' as will be seen from FIG. 1 in which only one of the link members 86 and only one of the link members 86' are shown. Each of the front link members 86 is pivotally connected adjacent one end thereof to the auxiliary slider plate 82 by means of a pivot pin 88 and adjacent the other end thereof to the carriage plate 84 by means of a pivot pin 90. The front link members 86 are located adjacent the front end of the auxiliary slider plate 82 and are substantially aligned with each other in a lateral direction of the above mentioned parallel motion structure. Similarly, each of the rear link members 86' is pivotally connected adjacent one end thereof to the auxiliary slider plate 82 by means of a pivot pin 88' and adjacent the other end thereof to the carriage plate 84 by means of a pivot pin 90'. The rear link members 86' are located in the neighborhood of the rear end of the slider plate 82 and are also substantially aligned with each other in a lateral direction of the above mentioned parallel motion structure. The link members 86 and 86' all have substantially equal lengths so that the carriage plate 84 positioned above the auxiliary slider plate 82 is movable upwardly and downwardly and further forwardly and rearwardly with respect to and substantially in parallel with the auxiliary slider plate 82.

The carriage plate 84 has formed in its downwardly stepped rear ledge portion 84a a circular opening 92 having a vertical center axis. The rear ledge portion 84a of the carriage plate 84 preferably has a chamfered or bevelled inner peripheral edge defining a lower end portion of the opening 92 which is therefore enlarged downwardly in inverted frusto-conical form as will be seen from FIG. 1.

The disc carrier mechanism 74 of the apparatus embodying the present invention further comprises a spindle support member 94 having a lower flange portion and an upper stem portion axially projecting upwardly from the lower flange portion. The upper stem portion of the disc support member 94 is, in cross section, downwardly enlarged also in inverted frusto-conical form. The spindle support member 94 thus configured externally has its stem portion upwardly passed through the opening 92 in the rear ledge portion 84a of the carriage plate 84 so that the lower flange portion of the support member 94 is engageable with the lower face of the rear ledge portion 84a. The spindle support member 94 is formed with a blind axial bore 96 extending axially in the stem portion of the support member 94 and axially open upwardly. A preloaded helical compression spring 98 is positioned in such a manner as to coaxially surround the stem portion of the spindle support member 94 having the stem portion axially projecting upwardly from the opening 92. The helical compression spring 98 is seated at one end thereof on the upper face of the rear ledge portion 84a of the carriage plate 84 and at the other end thereof on the lower face of an annular spring seat element 100 which is coaxially secured to the stem portion of the spindle support member 94 adjacent the upper end of the stem portion. Thus, the spring 98 serves to urge the spindle support member 94 upwardly with respect to the rear ledge portion 84a of the carriage plate 84 so that the lower flange portion of the support member 94 is forced against the lower face of the ledge portion 84a as shown in FIG. 1. The spindle support member 84 is downwardly movable into a predetermined lowermost limit axial position with respect to the rear ledge portion 84a of the carriage plate 84 against the force of the spring 98. When the spindle support member 84 is moved into such an axial position, the lower flange portion of the support member 94 is downwardly spaced apart from the lower face of the ledge portion 84a of the support member 84.

The spindle support member 94 configured and arranged as above described has supported thereon a spindle 102 which is rotatably received in the upwardly open blind axial bore 96 in the spindle support member 94. The spindle 102 axially projects upwardly from the blind axial bore 96 and has a circular disc support member 104 coaxially secured thereto in such a manner that the spindle 102 further projects upwardly from the disc support member 104. The spindle 102 has such a length that the disc support member 104 secured thereto is positioned above and substantially in parallel with the carriage plate 84 even when the spindle disc member 94 is downwardly moved into its lowermost limit axial position with respect to the rear ledge portion 84a of the carriage plate 84 against the force of the spring 98. The disc support member 104 is adapted to have the audio or video D supported on the upper face thereof with the upper end portion of the spindle 102 projecting upwardly through the central aperture in the disc.

The disc carrier mechanism 74 of the player apparatus according to the present invention further comprises velocity-multiplier means operative to multiply or double the velocity at which the disc D is to be moved into or out of the ready-for-loading position as compared with the velocity at which the main slider plate 76 is driven to move by a manual effort applied thereto.

In FIGS. 2 and 3 of the drawings, such velocity multiplier means is shown comprising four pulleys mounted on the main slider plate 76. The four pulleys consist of a first pair of pulleys 106a and 106b and a second pair of pulleys 106c and 106d. The pulleys 106a and 106b of the first pair are spaced apart from each other in a direction substantially parallel with the direction in which the slider plate 76 is longitudinally slidable on the base plate 10, viz., in the previously mentioned disc loading and unloading directions f and r. The pulleys 106c and 106d are also spaced apart from each other in a direction substantially parallel with the disc loading and unloading directions f and r. Furthermore, the pulleys 106a and 106b are spaced apart from the pulleys 106d and 106c, respectively, in directions substantially perpendicular to the disc loading and unloading directions f and r so that the four pulleys 106a to 106d are located in such a manner as to correspond to the four corners of a certain rectangular area. The pulleys 106a, 106b, 106c and 106d are rotatably mounted on shafts 108a, 108b, 108c and 108d, respectively, each secured to the main slider plate 76 and axially projecting upwardly from the upper face of the slider plate 76.

The above mentioned multiplier means further comprises a closed loop of flexible line consisting, for example, of a wire 110 and a preloaded helical tension spring 112 which is endwise spliced between the opposite ends of the wire 110 as shown in FIGS. 2 and 3. The closed loop of the wire 110 and the tension spring 112 is passed on the pulleys 106a to 106d is, thus, lengthwise movable round the pulleys with respect to the main slider plate 76 so as to heve two straight travelling path portions substantially parallel with the disc loading and unloading directions f and r and opposite in directions to each other. The wire 110 thus arranged is anchored at a suitable point P along one of these straight travelling path portions to the main slider plate 76 by means of a suitable anchor element 114 secured to the slider plate 76 and at a suitable point Q along the other of the straight travelling path portions to the auxiliary slider plate 82 by means of a suitable anchor element 116 (FIG. 3) secured to the slider plate 82. In the arrangement shown in FIGS. 2 and 3, the point P is shown located intermediate between the pulleys 106a and 106b of the first pair and the point Q is shown located intermediate between the pulleys 106c and 106d of the second pair. When, thus, the main slider plate 76 is moved in the forward or disc loading direction f on the base plate 10, the pulleys 106a to 106d are also moved in the direction f with respect to the base plate 10 so that the wire 110 is caused to travel with respect to the auxiliary slider plate 82 in the disc unloading direction r along its straight travelling path portion between the pulleys 106a and 106b of the first pair and to travel with respect to the auxiliary slider plate 82 in the disc loading direction f along its straight travelling path portion between the pulleys 106c and 106d of the second pair. When, on the contrary, the main slider plate 76 is moved in the rearward or disc unloading direction r on the base plate 10, the pulleys 106a to 106d are also moved in the direction r with respect to the base plate 10 with the result that the wire 110 is caused to travel with respect to the auxiliary slider plate 82 in the disc loading direction f along its straight travelling path portion between the pulleys 106a and 106b of the first pair and to travel with respect to the auxiliary slider plate 82 in the disc unloading direction r along its straight travelling path portion between the pulleys 106c and 106d of the second pair. The wire 110 is, in this fashion, not only moved in its entirety together with the main slider plate 76 with respect to the base plate 10 but lengthwise with respect to the auxiliary slider plate 82 at a velocity equal to the velocity at which the main slider plate 76 is moved with respect to the base plate 10. This means that the wire 110 along its straight travelling path portion between the pulleys 106c and 106d of the second pair is caused to travel with respect to the base plate 10 in the same direction as the direction of movement of the main slider plate 76 and at a velocity doubling the velocity of movement of the main slider plate 76. This further means that the auxiliary slider plate 82 is caused to travel with respect to the base plate 10 in the same direction as the direction of movement of the main slider plate 76 and at a velocity doubling the velocity of movement of the main slider plate 76. If, therefore, the main slider plate 76 is longitudinally moved a distance L with respect to the base plate 10, then the auxiliary slider plate 82 is enabled to move a distance 2L with respect to the base plate 10 in the same direction as the direction of movement of the main slider plate 76.

Figure 8A:
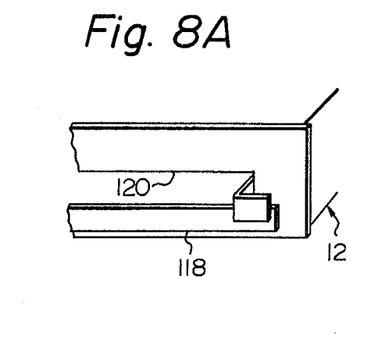
FIGS. 8A and 8B are fragmentary perspective views each showing the arrangement of a rear end portion of a switch actuating bar forming part of the apparatus embodying the present invention.
Figure 8B:
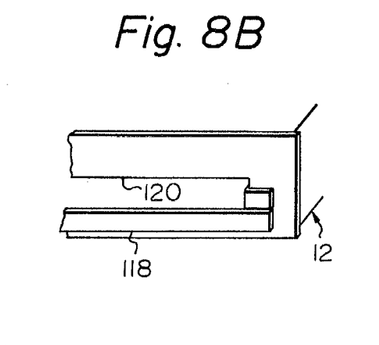

Thus, the main slider plate 76 has a longitudinal stroke in the fore-and-aft direction of the player apparatus between a predetermined first or foremost limit position abutting at its front end against the inner face of the front wall of the casing 12 as shown in FIG. 2 and a predetermined second or rearmost limit position abutting against suitable stom means (not shown) secured to the base plate 10 or the casing 12 as shown in FIG. 3. When the main slider 76 is held in the first or foremost limit position thereof, the point P at which the wire 110 is anchored to the base plate 10 is located in the vicinity of the pulley 106a while the point Q at which the wire 110 is anchored to the auxiliary slider plate 82 is located in the vicinity of the pulley 106c, as will be seen from FIG. 2. When, on the other hand, the main slider plate 76 is held in the second or rearmost limit position thereof, the point P is located in the vicinity of the pulley 106b while the point Q is located in the vicinity of the pulley 106d, as will be seen from FIG. 3. The main slider plate 76 thus held in the second or rearmost limit position thereof partially extends rearwardly from the rear end of the base plate 10, as will also be seen from FIG. 3. The casing 12 includes a rear panel member 118 formed with a horizontally elongated slot 120 as shown in FIG. 8A and 8B for permitting the slider plate 76 to project rearwardly from the casing 12.

With respect to the main slider plate 76 movable in the above described fashion between the first and second or foremost and rearmost limit positions thereof, the auxiliary slider plate 82 is longitudinally movable also in the fore-and-aft direction of the player apparatus between a first or foremost limit position having its front end located adjacent the front end of the main slider plate 76 as will be seen from FIG. 2 and a second or rearmost limit position having its rear end located in close proximity to the rear end of the main slider plate 76 as will be seen from FIG. 3. The auxiliary slider plate 82 assumes the first and second or foremost and rearmost limit positions thereof concurrently when the main slider plate 76 is held in the first and second or foremost and rearmost limit positions, respectively, thereof. When the main slider plate 76 and accordingly the auxiliary slider plate 82 are held in the respective second or rearmost limit positions thereof, the lower disc support unit composed of the spindle support member 94, spring 98, spring seat element 100, spindle 102 and disc support member 104 carried on the rear ledge portion 84a of the carriage plate 84 as previously described with reference to FIG. 1 is positioned outside and at the rear of the casing 12 with the auxiliary slider plate 82 and the carriage plate 84 forwardly extending each partially into the casing 12. The rear wall of the casing 12 is thus formed with an opening (not shown) allowing the passage of the lower disc support unit therethrough. The opening has a horizontal or lateral extent sufficient to allow passage therethrough of the audio or video disc to be mounted on the disc support member 104. When, furthermore, the main slider plate 76 and accordingly the auxiliary slider plate 82 are moved into positions immediately ahead of or at the rear of the respective first or foremost limit positions thereof, the above mentioned lower disc support unit is held in a predetermined lower inoperative position below the turntable 28 and has the spindle 106 located to be upwardly inserted into the lower blind bore 30b in the stem portion 30 of the turntable 28. In order to enable the disc support unit to upwardly move from such a lower inoperative position into a predetermined upper operative position having the spindle 102 axially received in the lower blind bore 30b, the disc player apparatus embodying the present invention further comprises a guide mechanism which is designated generally by reference numeral 122 in FIGS. 1 and 2 of the drawings.

The guide mechanism 122 is in part arranged on the carriage plate 84 of the disc carrier mechanism 74 and, thus, the carriage plate 84 has formed in its front end portion a generally U-shaped recess 124 which is open forwardly as will be seen from FIGS. 2 and 3. A cylindrical roller 126 is positioned partially in this recess 124 and is rotatably mounted on a shaft 128 secured to the carriage plate 84 in such a manner as to axially extend laterally of the plate 84 as indicated by broken lines in FIG. 3. The roller 126 is thus rotatable about the center axis of the shaft 128 extending perpendicularly in a direction parallel with the fore-and-aft direction of the player apparatus. The roller 126 partially protrudes forwardly from the front end of the carriage plate 84 as will be best seen from FIG. 4 of the drawings.

The above mentioned guide mechanism 122 further comprises a ramp member 130 upstanding from the upper face of the base plate 10 and attached to or located in proximity to the inner face of the front wall of the casing 12, as will be best seen from FIG. 1. The ramp member 130 is positioned substantially in alignment with the above described roller 126 on the carriage plate 84 in the fore-and-aft direction of the player apparatus and has a slanting surface portion 132 slanting upwardly away from the upper face of the base plate 10 and forwardly away from the roller 126. When the auxiliary slider plate 82 is moved into the position immediately ahead of the above mentioned foremost limit position thereof, the roller 126 carriage plate 84 which is held in a lower position close to the upper face of the underlying the slide plate 82 is brought into contact with a lower end portion of the slanting surface portion 132 of the ramp member 132.

When the auxiliary slider plate 82 is held in the rearmost limit position thereof or being moved between the foremost and rearmost limit positions thereof, the carriage plate 84 forming part of the parallel motion structure in cooperation with the auxiliary slider plate 82 and the link members 86 and 86' as previously described is held in a predetermined lowermost position above the upper face of the slider plate 82 by the weight of the lower disc support unit mounted on the rear ledge portion 84a of the carriage plate 84 and the weight of the disc D positioned on the disc support member 104 forming part of the lower disc support unit. The carriage plate 84 assumes such a lowermost position with the spindle support member 94 directly received on the upper face of the auxiliary slider plate 84 as indicated by full lines in FIG. 1.

At the point of time when the main slider plate 76 and accordingly the auxiliary slider plate 82 are moved into the positions immediately ahead of the respective foremost limit position thereof and cause the roller 126 to be brought into contact with the slanting surface portion 132 of the ramp member 130, the carriage plate 84 is still held in the above mentioned lowermost position thereof above the auxiliary slider plate 82. Under these conditions, the lower disc support unit on the rear ledge portion 84a of the carriage plate 84 assumes the previously mentioned ready-for-loading position thereof. As the main slider plate 76 and accordingly the auxiliary slider plate 82 are further moved toward the respective foremost limit positions thereof, the roller 126 on the carriage plate 84 is caused to roll about the center axis of the shaft 128 and climb upwardly and slightly forwardly on the slanting surface portion 132 of the ramp member 130. The carriage plate 84 is therefore forced upwardly and slightly rearwardly with respect to the underlying auxiliary slider plate 82 with the link members 86 and 86' caused to slightly turn rearwardly about the pivot pins 88 and 88', respectively, on the slider plate 82. The carriage plate 84 is, as a consequence, ultimately raised into a predetermined upper position having the spindle 102 of the lower disc support unit axially received into the lower blind bore 30b in the central stem portion 30 of the turntable 28 as indicated by phantom lines in FIG. 1. The audio or video disc D supported on the upper face of the disc support member 104 mounted on the spindle 102 thus fitted to the stem portion 30 of the turntable 28 is is pressed firmly against the lower face of the turntable 28 by the force of the spring 98 urging the spindle support member 94 and accordingly the spindle 102 upwardly with respect to the stepped lower rear ledge portion 84a of the carriage plate 84. With the disc support member 104 now pressed against the lower face of the disc D pressed onto the lower face of the turntable 28, the spindle support member 94 and the spring seat element 100 secured to the support member 94 are lowered with respect to the rear ledge portion 84a of the carriage plate 84 by the force of the spring 98 so that the lower flange portion of the spindle support member 94 is spaced apart downwardly from the lower face of the rear ledge portion 84a of the carriage plate 84 as indicated by the phantom lines in FIG. 1. Thus, the lower disc support unit including the spindle support member 94 moved into such a position with respect to the ledge portion 84a of the carriage plate 84 is held in an upper operative position with respect to the carriage plate 84 and further to the previously mentioned disc and drive support structure 14.

When the lower disc support unit is held in the above mentioned upper operative position with respect to the carriage plate 84 and the disc and drive support structure 14, not only the disc and drive support structure 14 is in its entirety suspended vertically by the vertical posts 16 through the intermediary of the compression springs 20 elastically supporting the player board 22 but also the lower disc support unit is held in a suspended state with respect to the carriage plate 84 by means of the compression spring 98 seated between the spindle support member 94 and the spring seat element 100 secured to the spindle support member 94. Thus, the compression spring 98 serves as an elastic support element in the lower disc support unit.

Though not shown in the drawings, the previously described automatic arm drive mechanism 52 further comprises actuating means adapted to provide mechanical coupling between the drive and driven gears 54 and 56 of the mechanism 52 when the mechanism 52 is to be put into operation to drive the pickup arm 44 for lead-in motion from the rest position of or return motion to the rest position thereof. Such actuating means may comprise a tooth element normally incorporated into a cavity formed in the driven gear 56 and arranged to project from the gear 56 into mating engagement with teeth of the drive gear 54 when actuated. In the apparatus embodying the present invention, such actuating means is operated in an electric fashion and is electrically connected to a power source across suitable switch means. In FIGS. 2 and 3 of the drawings, such switch means is shown comprising a switch unit 134 having a control plunger 134a. The switch unit 134 is electrically connected not only between the above mentioned actuating means and the power source but also between the power source and the coil assembly 36 of the previously described drive means of the disc player apparatus embodying the present invention, as will be understood more clearly as the description proceeds.

The above mentioned switch unit 134 is fixedly positioned adjacent the front wall of the casing 12 and is located above a front end portion of the main slider plate 76 when the slider plate 76 is held in the previously mentioned foremost limit position thereof. The switch unit 134 is further positioned in such a manner as to have the control plunger 134a directed rearwardly and therefore axially movable toward and away from the main slider plate 76.

The switch unit 134 thus arranged in conjunction with the main slider plate 76 is actuated by a switch actuating mechanism 136 which comprises an elongated switch actuating bar 138. The switch actuating bar 138 extends and movable longitudinally over the main slider plate 76 in a direction substantially parallel with the fore-and-aft direction of the player apparatus and is substantially aligned with the above described switch unit 134. The switch actuating bar 138 is formed with at least two elongated slots 140a and 140b. Each of the slots 140a and 140b is elongated in parallel with the direction in which the switch actuating bar 138 is longitudinally elongated and movable and has received therein a suitable pin secured to the main slider plate 76 and axially projecting upwardly from the upper face of the slider plate 76. In the arrangement illustrated in FIGS. 2 and 3, such a pin is shown constituted by each of the pins 108a and 108b supporting the pulleys 106a and 106b of the first pair. The slot 140a having the pin 108a received therein is formed in an intermediate longitudinal portion of the bar 138, while the slot 140b having the pin 108b received therein is shown, by way of example, as being formed in a front end portion of the bar 138 and being open forwardly. The switch actuating bar 138 is thus longitudinally movable over the main slider plate 76 a predetermined distance substantially equal to the shorter one of the slots 140a and 140b, viz., the slot 140a formed in the intermediate longitudinal portion of the bar 138. With respect to the main slider plate 76, the switch actuating bar 138 is longitudinally movable between a predetermined first or foremost limit position with the pin 106a located at the rear end of the slot 140a as shown in FIG. 2 and a predetermined second or rearmost limit position with the pin 106a located at the front end of the slot 140a as shown in FIG. 3. The switch actuating bar 138 is urged to stay in the rearmost limit position thereof with respect to the main slider plate by suitable biasing means. In FIGS. 2 and 3 of the drawings, such biasing means is shown comprising a preloaded helical tension spring 142 which is anchored at one end to a projection 138a of the switch actuating bar 138 and at the other end to a pin 144 secured to the main slider plate 76.

The switch actuating bar 138 has secured thereto a pin 146 projecting upwardly from a front end portion of the bar 138. The pin 146 is located on the switch actuating bar 138 in such a manner as to be brought into pressing contact with the control plunger 134a of the switch unit 134 when the bar 138 is moved into the above mentioned foremost limit position thereof as shown in FIG. 2. When the control plunger 134a of the switch unit 134 is thus pressed by the pin 146 on the switch actuating bar 138, the switch unit 134 is caused to close. The switch actuating bar 138 has a laterally bend rear end portion 138b rearwardly projecting out of the slot 120 in the rear panel member 118 of the casing 12 and located in the vicinity of the lateral end portion of the panel member 118 as shown in FIGS. 8A and 8B. When the switch actuating bar 138 is held in the above mentioned rearmost limit position thereof with respect to the main slider plate 76, the rear end portion 138b of the bar 138 is rearwardly spaced apart from the outer face of the lateral end portion of the rear panel member 118 as will be seen from FIG. 8A. When, on the other hand, the switch actuating bar 138 is held in the foremost limit position thereof with respect to the main slider plate 76, the rear end portion 138b of the bar 138 is held in contact with the outer face of the lateral end portion of the rear panel member 118 as will be seen from FIG. 8B.

The disc player apparatus embodying the present invention further comprises a locking device capable of locking the above described switch actuating mechanism 136 in a switch-in condition holding the switch unit 134 in a closed condition and locking the pickup arm 44 in the rest position thereof. More specifically, the locking device is operative to hold the switch actuating mechanism 136 locked in the switch-in condition while holding the pickup arm 44 unlocked from the rest position thereof or alternately hold the pickup arm 44 locked in the rest position thereof while holding the switch actuating mechanism 136 unlocked from the above mentioned switch-in condition thereof.

Such a locking device is in its entirety represented by reference numeral 148 in FIGS. 2 and 3 of the drawings and comprises a first bell-crank lever 150 located in the neighborhood of the switch unit 134 and having an intermediate fulcrum portion pivotally mounted on a shaft 152 fixed with respect to the base plate 10 and the casing 12. The shaft 152 longitudinally extends normally to the upper face of the base plate 10 so that the bell-crank lever 150 is pivotally movable about a vertical axis fixed with respect to the base plate 10 and accordingly to the switch unit 134. The bell-crank lever 150 further has first and second arm portions 150a and 150b projecting from the fulcrum portion of the lever 150 and angularly spaced apart from each other about the center axis of the shaft 152.

The locking device 148 shown in FIGS. 2 and 3 further comprises a solenoid-operated lever actuating unit 154 positioned in the neighborhood of the bell-crank lever 150 fixedly with respect to the base plate 10 and the casing 12. The solenoid-operated lever actuating unit 154 has a plunger 154a axially movable with respect to the base 10 and the casing 12 and is pivotally connected by a pin 156 to the first arm portion 150a of the bell-crank lever 150. The lever actuating unit 154 is adapted to have the plunger 154a urged to axially protrude forwardly by suitable biasing means (not shown) incorporated in the unit 154 and to have the plunger 154a axially moved rearwardly when the unit 154 is electrically energized.

The bell-crank lever 150 further has a hook portion 150c projecting from the second arm portion 150b of the lever 150 and engageable with the pin 146 on the above described switch actuating bar 138 when the main slider plate 76 carrying the switch actuating bar 138 thereon is moved into the foremost limit position thereof with respect to the base plate 10. The bell-crank lever 150 is, thus, pivotally movable about the center axis of the shaft 152 between a first angular position corresponding to the axially projecting position of the plunger 154a of the above described solenoid-operated lever actuating unit 154 as will be seen from FIG. 3, and a second angular position corresponding to the axially retracted position of the plunger 154a of the lever actuating unit 154 as will be seen from FIG. 2. When the bell-crank lever 150 is held in the above mentioned first angular position thereof about the center axis of the pin 152, the hook portion 150c of the lever 150 is located outside the path of the pin 146 on the switch actuating bar 138 with respect to the base plate 10 and is therefore unengageable with the pin 146. When, on the other hand, the bell-crank lever 150 is held in the second angular position thereof about the center axis of the shaft 152, the hook portion 150c of the bell-crank lever 150 is located in the path of the pin 146 on the switch actuating bar 138 with respect to the base plate 10 and is therefore engageable with the pin 146.

The locking device 148 of the disc player apparatus embodying the present invention further comprises an elongated connecting rod 158 and a second bell-crank lever 160 which is located in the neighborhood of the pickup arm 44 and which has an intermediate fulcrum portion pivotally mounted on a shaft 162 fixed with respect to the base plate 10 and the casing 12. The shaft 162 longitudinally extends also normally to the upper face of the base plate 10 so that the second bell-crank lever 160 is pivotally movable about a vertical axis substantially parallel with the vertical axis of rotation of the fulcrum unit 46 of the pickup assembly 42 and the pivotal axis of the first bell-crank lever 150. The second bell-crank lever 160 also has first and second arm portions 160a and 160b extending from the fulcrum portion of the lever 160 and angularly spaced apart from each other about the center axis of the shaft 162. The connecting rod 158 is pivotally connected adjacent one end thereof to the second arm portion 150b of the first bell-crank lever 150 by means of a pin 164 and adjacent the other end thereof to the first arm portion 160a of the second bell-crank lever 160 by means of a pin 166. The second bell-crank lever 160 further has a hook portion 160c merging out of the second arm portion 160b thereof. The hook portion 160c of the second bell-crank lever 160 is engageable with a pin 168 secured to and axially projecting upwardly from the pickup arm 44. The angular movement of the first bell-crank lever 160 about the center axis of the shaft 152 is transmitted through the connecting rod 158 and the pins 164 and 166 to the second bell-crank lever 160, which is accordingly pivotally movable about the center axis of the shaft 162 between a first angular position indicated by full lines in FIG. 3 and a second angular position indicated in FIG. 2. The first and second angular positions of the second bell-crank lever 160 correspond to the first and second angular positions, respectively, of the first bell-crank lever 150 about the center axis of the shaft 152. When the second bell-crank lever 160 is held in the first angular position thereof about the center axis of the shaft 162, the hook portion 160c of the lever 160 is located to engage the pin 168 on the pickup arm 44 in the rest position thereof as shown in FIG. 3 and is thus operative to hold the pickup arm 44 locked in the rest position. When, on the other hand, the second bell-crank lever 160 is held in the second angular position thereof about the center axis of the shaft 162, the hook portion 160c of the lever 160 is located outside the path of the pin 168 on the pickup arm 44 rotatable about the vertical axis of rotation of the fulcrum unit 46 and is therefore unengageable with the pin 168. The second bell-crank lever 160 is urged to stay in the first angular position thereof by suitable biasing means such as a preloaded helical tension spring 170 which is shown anchored at one end thereof to the second arm portion 160b of the lever 160 and at the other end thereof to a suitable anchor element secured to or forming part of the base plate 10 or the casing 12.

Figure 5:
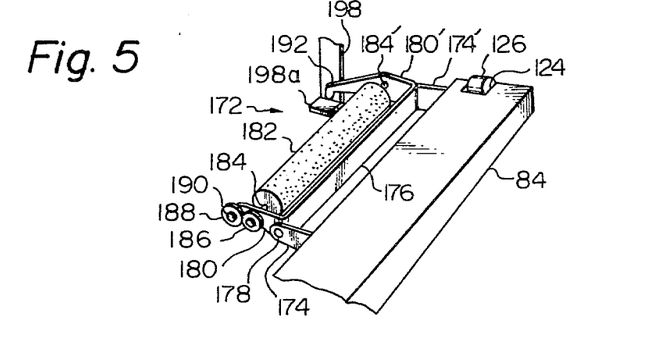
FIG. 5 is a fragmentary perspective view showing the disc cleaning mechanism of the apparatus embodying the present invention.
Figure 6:
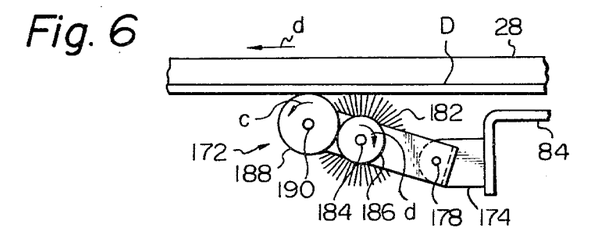
FIG. 6 is a rear end view of the disc cleaning mechanism illustrated in FIGS. 4 and 5.

The disc player apparatus embodying the present invention further comprises a disc cleaning mechanism which is shown principally in FIGS. 4, 5 and 6 and which is in its entirety represented by reference numeral 172 therein.

The disc cleaning mechanism 172 as shown comprises a pair of support arm members 174 and 174' which are secured to the carriage plate 84 of the disc carrier mechanism 74 and which project laterally from one side face of the carriage plate 84 as will be best seen from FIG. 5. The arm members 174 and 174' are spaced apart substantially in parallel from each other in a direction parallel with the direction of movement of the carriage plate 84 with respect to the base plate 10 (FIG. 1) and have a rockable bracket member 176 pivotally mounted thereon by means of pins 178 only one of which is seen in FIGS. 4 to 6. The pins 178 have respective center axes substantially aligned with each other in the above mentioned direction so that the rockable bracket member 176 as a whole is pivotally movable about an axis which is fixed with respect to the carriage plate 84 and which is substantially parallel with the direction in which the carriage plate 84 is longitudinally movable with respect to the base plate 10. The rockable bracket member 176 has a pair of arm portions 180 and 180' which are spaced substantially in parallel from each other and which extend away from the arm members 174 and 174', respectively. A generally cylindrical brushing body 182 having a pair of trunnions 184 and 184' axially projecting from the opposite end faces of the brushing body 182 is supported on these arm portions 180 and 180' of the bracket members 176 with the trunnions 184 and 184' rotatably received in holes formed in the arm portions 180 and 180', respectively. The trunnions 184 and 184' have respective center axes substantially parallel with the adjacent side face of the carriage plate 84 so that the brushing body 182 is rotatable with respect to the rockable bracket member 176 about an axis substantially parallel with the direction in which the carriage plate 84 is longitudinally movable with respect to the base plate 10. The axis of rotation of the brushing body 182 is fixed with respect to the rockable bracket member 176 but is rotatable with respect to the carriage plate 84 about the axis of rotation of the bracket member 176 with respect to the carriage plate 84. The brushing body 182 may be composed of a cylindrical member having a myriad of bristles pegged thereto as will be seen from FIG. 6 or covered with a piled or napped web of textile (not shown). The trunnions 184 and 184' may be substituted by a single shaft extending throughout the length of the brushing body 182 and having end portions axially projecting outwardly from the opposite end faces of the brushing body 182.

One of the trunnions 184 and 184' such as the trunnion 182 as shown axially projects outwardly from the outer face of the arm portion 180 of the rockable bracket member 176 and has a driven roller 184 fixedly mounted on its projecting end portion as will be best seen from FIG. 5. The arm portion 180 of the bracket member 176 has further supported thereon a drive roller 188 which is rotatably mounted on a shaft 190 secured to the arm portion 180 and axially projecting substantially in parallel with the above mentioned end portion of the trunnion 184 from the outer face of the arm portion 180. The drive roller 188 is held in rollable contact with the driven roller 186 and is rotatable with respect to the arm portion 180 of the rockable bracket member 176 about the center axis of the shaft 190 substantially in parallel with the axis of rotation of the brushing body 182 and accordingly with the axis of rotation of the bracket member 176 with respect to the carriage plate 84. It is in this instance noted that the driven and drive rollers 186 and 188 thus arranged are rotatable together in opposite directions to each other about the center axes of the trunnion 184 and the shaft 190, respectively, with respect to the rockable bracket member 176 and accordingly to the carriage plate 84. The rockable bracket member 176 further has a lug portion 192 projecting from one of the arm portions 180 and 180' of the bracket member 176 such as the arm portion 180' opposite to the arm portion 178 carrying the above described rollers 186 and 188 thereon.

The disc cleaner mechanism 172 of the player apparatus embodying the present invention further comprises a swivel rod 194 extending in parallel with the direction of movement of the carriage plate 84 and cantilevered at one end to the casing 12 in such a manner as to be rotatable a out the center axis thereof. The swivel rod 194 is securely connected adjacent its centilevered end to an end portion of a lever 196 which is pivotally connected adjacent the other end thereof to a movable lift member 198 by means of a pin 200 having a center axis substantially parallel with the center axis of the swivel rod 194. The lift member 198 extends downwardly from the pin 200 and has a horizontally bent lower end portion 198a. The swivel rod 194, lever 196 and lift member 198 are arranged so that the horizontally bent lower end portion 198a of the lift member 198 is movable in the vicinity of the above mentioned lug portion 192 of the rockable bracket member 176 when the carriage plate 84 is moved into or located immediately ahead of the foremost longitudinal position thereof with respect to the base plate 10. When the carriage plate 84 is held in or located immediately ahead of such a position, the horizontally bent lower end portion 198a of the lift member 198 is positioned immediately below the lug portion 192 of the rockable bracket member 176 carried by the carriage plate 84 as will be seen from FIGS. 4 and 5.

The swivel rod 194 rearwardly extends substantially perpendicularly from the lever 196 and terminates in the vicinity of the second arm portion 66b of the previously described locking lever 66. The swivel rod 194 has secured to its leading or rear end portion a lug member 202 having a tongue portion projecting outwardly away from the center axis of the rod 194. The second arm portion 66b of the locking lever 66 is engageable with the lug member 202 thus carried by the swivel rod 194 and is brought into pressing engagement with the tongue portion of the lug member 202 when the locking member 66 is forced to turn about the center axis of the shaft 68 away from the center axis of the associated lock control cam member 64 against the force of the spring 70 (FIG. 3). The pressing force imparted to the lug member 202 on the swivel rod 194 by the locking lever 66 causes the swivel rod 194 to spin about the center axis thereof and, in turn, causes the lever 196 and the lift member 198 to turn about the center axis of the rod 194. The tongue portion of the lug member 202 projects upwardly away from the center axis of the swivel rod 194 so that the lever 196 is caused to turn about the center axis of the rod 194 in a direction to raise the lift member 198 as indicated by arrow b in FIG. 4. The lift member 198 thus moved upwardly over the upper face of the base plate 10 is brought into upwardly pressing engagement with the lug portion 192 of the rockable bracket member 176 and causes the bracket member 176 to turn together with the brushing body 182 about the center axes of the pins 178 on the arm members 174 and 174' on the carriage plate 84.

Figure 7:
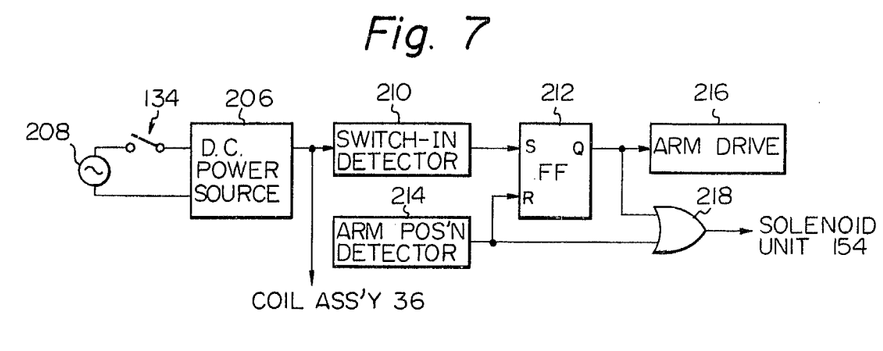
FIG. 7 is a block diagram showing a control circuit incorporated in the disc player apparatus embodying the present invention.

The coil assembly 36 of the turntable drive means, the solenoid-operated lever actuating unit 154 and the electric actuating means for the automatic arm drive mechanism 52 are energized from a power source through a control circuit 204 illustrated in FIG. 7. Referring to FIG. 7 of the drawings, the control circuit 204 comprises a d.c. power source network 206 having terminals connected across a suitable a.c. power source 208 such as a mains convenience socket (not shown) and a normally-open switch which is constituted by the previously described switch unit 134 (FIGS. 2 and 3). The d.c. power source network 206 has an output terminal connected to a switch-in detector circuit 210 and further to the coils forming part of the coil assembly 36 of the previously described turntable drive means (FIG. 1). The switch-in detector circuit 210 is responsive to the d.c. current supplied from the d.c. power source network 206 with the switch unit 134 closed and is connected to a suitable bistable memory circuit such as for example a set-reset flipflop circuit 212. The flipflop circuit 212 has a set terminal S connected to the output terminal of the switch-in detector circuit 210 and a reset terminal R connected to the output terminal of an arm position detector circuit 214. The arm position detector circuit 214 is responsive to the movement of the pickup arm 44 (FIGS. 2 and 3) and is operative to produce an output signal when the pickup arm 44 is moved out of the rest position thereof, viz., during a lead-in motion, a return motion, or a playback condition of the pickup arm 44. The flipflop circuit 212 further has an output terminal Q connected to the electric actuating means 216 for the previously described automatic arm drive mechanism 52 (FIG. 1) and further to one input terminal of a two-input logic "OR" gate circuit 218. The other input terminal of the logic "OR" gate circuit 218 is connected to the output terminal of the above mentioned arm position detector circuit 214. The output terminal of the logic "OR" gate circuit 218 is connected to the solenoid coil (not shown) of the previously described solenoid-operated lever actuating unit 154 (FIGS. 2 and 3). Thus, the solenoid-operated lever actuating unit 154 is energized from the d.c. power source network 206 either when the pickup arm 44 is off the rest position thereof or when the switch unit 134 is closed with the pickup arm 44 held in the rest position thereof.

Operation of the disc player apparatus thus constructed and arranged in accordance with the present invention will be hereinafter described with concurrent reference to FIGS. 1 to 7 and FIGS. 8A and 8B of the drawings.

Prior to starting of the operation, the disc carrier mechanism 74 as a whole is positioned within the casing 12 and the pickup arm 44 is held in the rest position thereof. The carriage plate 84 of the disc carrier mechanism 74 is held in the previously mentioned predetermined lowermost position above the auxiliary slider plate 82 by the weight of the lower disc support unit mounted on the carriage plate 84. The main slider plate 76 supporting thereon the parallel motion structure including the auxiliary slider plate 82 and the carriage plate 84 thus positioned is in its entirety retracted into the casing 12 with the switch actuating bar 138 held, with respect to the main slider plate 76, in the rearmost limit position thereof by the force of the spring 142. The pin 146 on the switch actuating bar 138 is thus spaced apart from the control plunger 134a of the switch unit 134, which is accordingly held in the open condition thereof. The switch unit 134 being thus held open, the solenoid-operated lever actuating unit 154 remains de-energized and has the plunger 154a maintained in the extended position, holding the first bell-crank lever 150 of the locking device 148 in the first angular position thereof having the arm portion 150b of the lever 150 disengaged from the pin 146 on the switch actuating bar 138 as shown in FIG. 3. With the first bell-crank lever 150 thus held in the first angular position thereof, the second bell-crank lever 160 is also held in the first angular position thereof and therefore has its second arm position 160b held in locking engagement with the pin 168 on the pickup arm 44. The switch unit 134 being held in the open condition, furthermore, the electric actuating means for the automatic arm drive mechanism 52 remains de-energized so that the lock control cam member 64 attached to the gear 56 of the arm drive mechanism 52 is held by the force of the associated spring 70 in the angular position having the concavely curved cam lobe portion 64a received by the first arm portion 66a of the locking lever 66. The gear 56 of the arm drive mechanism 52 is thus held in the angular position having the plain or gearless outer peripheral portion 56a directed toward the drive gear 54 on the stem portion 30 of the turntable 28. With the locking lever 66 being held in the angular position having the first arm portion 66a received on the cam lobe portion 64a of the lock control cam member 64, the second arm portion 66b of the locking lever 66 is disengaged from the lug member 202 on the swivel rod 194 of the disc cleaning mechanism 172 so that the left member 198 of the mechanism 172 is allowed to stay in the lowermost position thereof by the weight of the lift member 198 per se. The rockable bracket member 176 of the disc cleaning mechanism 172 is therefore held in a lower angular position about the center axes of the pins 178 (FIGS. 5 and 6) on the arm members 174 and 174' secured to the carriage plate 84, as shown in FIG. 4. The switch unit 134 being open, furthermore, the coil assembly 36 remains de-energized so that the turntable 28 and accordingly the drive gear 54 on the stem portion 30 of the turntable 28 are held at rest.

Before a playback operation is to be started, a desired audio or video disc D to be played back must be mounted on the disc support unit of the player apparatus. For this purpose, the switch actuating bar 138 is rearwardly pulled from the casing 12 at the rear end portion 138b of the bar 138. As the switch actuating bar 138 is thus moved rearwardly with respect to the casing 12, the main slider plate 76 and accordingly the lower disc support unit including the auxiliary slider plate 82 are moved in their respective disc unloading directions f with respect to the base plate 10. In this instance, the auxiliary slider plate 82 and accordingly the lower disc support unit mounted on the carriage plate 84 are enabled to move at a velocity doubling the velocity of movement of the main slider plate 76 by virtue of the previously described velocity multiplier means. The main and slider plates 76 and 82 are thus moved into their respective rearmost limit positions with respect to the base plate 10 as shown in FIG. 3. The main and auxiliary slider plates 76 and 82 being thus moved into the respective rearmost limit positions thereof, the brushing body 182 of the disc cleaning mechanism 172 is moved together with the carriage plate 84 out of the casing 12 and can thus be cleaned if desired.

The disc D to be played back is then positioned on the upper face of the disc support member 104 forming part of the lower disc support unit mounted on the rear ledge portion 84a of the carriage plate 84 projecting rearwardly from the casing 12. The disc D is being thus mounted on the disc support member 104 with the spindle 102 projecting upwardly through the central aperture in the disc, the carriage plate 84 is held, with respect to the auxiliary slider plate 82, in the predetermined lowermost position having the spindle support member 94 positioned on the upper face of the auxiliary slider plate 82 as indicated by the full lines in FIG. 1.

The main slider plate 76 is then moved in the disc loading direction f thereof with respect to the base plate 10 by manually applying a pressing force to the slider plate 76 at, for example, the rear end of the slider plate 76. As the main slider plate 76 is thus moved forwardly on the base plate 10, the auxiliary slider plate 82 and accordingly the lower disc support unit carried on the carriage plate 86 are moved into the casing 12 at a velocity doubling the velocity at which the main slider plate 76 advances forwardly with respect to the base plate 10. The lower disc support unit on the carriage plate 84 is thus moved into the previously mentioned ready-for-loading position below the turntable 28. As the main and auxiliary slider plates 76 and 82 are further moved forwardly and reach positions immediately ahead of their respective foremost limit positions thereof with respect to the base plate 10, the roller 126 on the carriage plate 84 is brought into rolling contact with the slanting surface portion 132 of the ramp member 130 and is caused roll and climb upwardly and slightly forwardly on the surface portion 132. This causes the carriage plate 82 and accordingly the disc support unit thereon to move upwardly with respect to the auxiliary slider plate 82 which is still being moved forwardly. When the carriage plate 82 thus reaches the predetermined uppermost position thereof above and with respect to the auxiliary slider plate 82, the disc support unit on the carriage plate 82 is moved into the uppermost operative position thereof and has the spindle 102 received into the lower blind bore 30b in the stem portion 30 of the turntable 28 forming part of the disc and drive support structure 14. The disc D to be played back is now received between the lower face of the turntable 28 and the upper face of the rotatable disc support member 104 of the disc support unit on the carriage plate 84 as indicated by the phantom lines in FIG. 1. The spindle 102 of the disc support unit thus serves not only as means to hold the disc D on the lower face of the turntable 28 but as positioning means to enable the disc support unit to be correctly positioned with respect to the turntable 28.

When the lower disc support unit is thus moved into the upper operative position thereof, the spindle support member 94 is downwardly moved with respect to the rear ledge portion 84a of the carriage plate 84 by the force of the spring 98 and has its lower flange portion spaced apart downwardly from the lower face of the rear ledge portion 84a. The disc is in this manner received between the turntable 28 and the disc support member 104 by the force of the spring 98 of the disc support unit so that the disc support unit and the disc and drive support structure 14 are held in suspended states above the base plate 10 by means of the spring 98 and the springs 20 supporting the disc and drive support structure 14. If, therefore, the base plate 10 and the casing 12 are subjected to vibrations, such vibrations are dampened out by these springs 20 and 98 before they reach the disc and drive support structure 14. This will lend itself to prevention of howing of the player apparatus.

The main and auxiliary slider plates 76 and 82 being now held in their respect foremost limit positions with respect to the base plate 10, the switch actuating bar 138 of the switch actuating mechanism 136 shown in FIGS. 2 and 3 is held in its rearmost limit position with respect to the main slider plate 76 by the force of the spring 142 and has its rear end portion 138b slightly spaced apart rearwardly from the outer face of the rear panel member 118 of the casing 12 as shown in FIG. 8A. When the switch actuating bar 138 in such a position is depressed forwardly until the rear end portion 138b of the bar 138 is brought into abutting contact with the outer face of the rear panel member 118, the switch actuating bar 138 is moved into the foremost limit position thereof with respect to the main slider plate 76 against the force of the spring 142 so that the pin 146 on the bar 138 is brought into pressing contact with the control plunger 134a of the switch unit 134. The control plunger 134a being thus depressed by the pin 146, the switch unit 134 is actuated to close and, in turn, actuates the flipflop circuit 212 (FIG. 7) through the set terminal S of the circuit, causing the flipflop circuit 212 to produce an output signal from its output terminal Q. In response to the output signal delivered from the flipflop circuit 212, the electric actuating means 216 for the automatic arm drive mechanism 52 shown in FIGS. 1 and 4 is energized from the d.c. power source network 206 (FIG. 7) and causes the driven gear 56 of the mechanism 52 to engage the drive gear 54 on the stem portion 30 of the turntable 28. The output signal from the flipflop circuit 212 is further fed to the logic "OR" gate circuit 218 and energizes the solenoid-operated lever actuating unit 154 from the d.c. power source network 206. The solenoid-operated lever actuating unit 154 thus energized causes the plunger 154a to axially retract and drive the first bell-crank lever 150 to turn from the first angular position to the second angular position thereof about the center axis of the shaft 152. It therefore allows that the hook portion 150c of the first bell-crank lever 150 is brought into locking engagement with the pin 146 on the switch actuating bar 138 and holds the switch unit 134 in the closed condition thereof. The turning motion of the first bell-crank lever 150 is transmitted through the connecting rod 158 to the second bell-crank lever 160 and causes the bell-crank lever 160 to turn also from the first angular position to the second angular position thereof about the center axis of the shaft 162 against the force of the spring 170. The result is that the hook portion 160c of the second bell-crank lever 160 is disengaged from the pin 168 on the pickup arm 44 and makes the pickup arm 44 reay for movement out of the rest position thereof. While it has been assumed in the foregoing description that the switch actuating bar 138 is depressed and accordingly the switch unit 134 is actuated to close after the disc carrier mechanism 74 has been moved into the casing 12 by applying a pressing force to the main slider plate 76, the switch actuating mechanism 136 may be operated to be brought into the switch-in condition thereof concurrently when the main and auxiliary slider plates 76 and 82 are moved into the foremost limit positions thereof with respect to the base plate 10. This is performed by moving the disc carrier mechanism 74 forwardly by applying a pressing force to the rear end portion 138b of the switch actuating bar 138 so that the switch actuating bar 138 is enabled to reach the foremost limit position thereof with respect to the main slider plate 76 simultaneously when the main and auxiliary slider plates 76 and 82 reach their respective foremost limit positions thereof with respect to the base plate 10.

The switch unit 134 being closed, the coil assembly 136 of the turntable drive means is energized from the d.c. power source network 206 and drives the turntable 28 to rotate about the center axis of the shaft 26 depending from the player board 22. By virtue of the engagement produced between the drive and driven gears 54 and 56 of the automatic arm drive mechanism 52, the rotation of the turntable 28 is transmitted through the drive gear 54 to the driven gear 56 and further through the driven gear 56 to each of the arm drive and lock control cam members 60 and 64 secured to the gear 56. The rotation of the arm drive cam member 60 causes the cam follower member 62 to drive the pickup arm 44 into lead-in motion from the rest position thereof with the pin 168 already released from the bell-crank lever 160 forming part of the locking device 148. The pickup arm 44 being thus initiated into lead-in motion from the rest position thereof, the arm position detector circuit 214 clears the flipflop circuit 212 at the reset terminal R thereof (FIG. 7). The actuating means 216 for the automatic arm drive mechanism 52 is, as a consequence, disconnected from the d.c. power source network 206 but the arm drive mechanism 52 is permitted to continue its operation with the driven gear 56 held in mesh with the drive gear 54. After the flipflop circuit 212 has been cleared, the solenoid-operated lever actuating unit 154 is energized through the arm position detector circuit 214 which is now maintained in an operative condition responsive to the lead-in motion of the pickup arm 44.

On the other hand, the rotation of the lock control cam member 64 causes the locking lever 66 to turn about the center axis of the shaft 68 in the direction of the arrow a (FIG. 4) against the force of the spring 70. The second arm portion 66b of the locking lever 66 thus turned is brought into pressing contact with the upwardly projecting tongue portion of the lug member 202 carried on the swivel rod 194 of the disc cleaning mechanism 172 shown in FIGS. 4 to 6. The swivel rod 194 is therefore caused to spin about the center axis thereof in the direction of the curved arrow in FIG. 4 and, through the lever 196, causes the lift member 198 to move upwardly above the upper face of the base plate 10 as indicated by the arrow b in FIG. 4.

The main and auxiliary slider plates 76 and 82 being held in the respective foremost limit positions thereof with respect to the base plate 10, the lug portion 192 of the rockable bracket 176 supported on the carriage plate 84 by means of the arm members 174 and 174' is located above the horizontally bend lower end portion 198a of the lift member 198. The lower end portions 198a of the lift member 198 moved upwardly as above described is brought into upwardly pressing engagement with the lug portion 192 of the rockable bracket member 176 and causes the bracket member 176 to turn upwardly about the aligned center axes of the pins 178 fitted to the arm members 174 and 174'. The rockable bracket member 176 is thus caused to turn upwardly with respect to the carriage plate 84 and accordingly to the base plate 10 and ultimately reaches an angular position holding the brushing body 182 and the drive roller 88 in contact with the lower face of the disc D attached to the lower face of the turntable 28. The drive roller 188 is preferably arranged on the bracket member 176 in such a manner as to be brought into contact with the central labeled area of the disc D under these conditions. The disc D being rotated with the turntable 28 with respect to the carriage plate 84 carrying the bracket member 176, the roller 188 pressed onto the lower face of the disc D is driven to rotate in the direction of arrow c about the center axis of the shaft 190 on the arm portion 180 of the bracket member 176 as the disc D is rotated about the center axis of the spindle 102 in a direction indicated by arrow d in FIG. 6. The rotation of the driver roller 188 is transmitted to the driven roller 186 through the rolling contact between the rollers 188 and 186 thereby drives the brushing body 182 for rotation about the aligned center axes of the trunnions 184 and 184', causing the brushing body 182 to brush and clean the lower face of the disc D rotating above the brushing body 182. In this instance, the driven roller 186 is driven to turn about the center axis of the trunnion 184 in the direction of arrow c' opposite to the direction of rotation of the drive roller 188 with the result that the brushing body 182 is rotated about the aligned center axes of the trunnions 184 and 184' in a direction opposite to the direction of the arrow d in which the disc D travels with respect to the brushing body 182.

By and in response to a single full turn of the driven gear 56 of the automatic arm drive mechanism 52, the pickup arm 44 completes its lead-in motion and, on the other hand, the locking lever 66 is truned about the center axis of the shaft 68 into its initial angular position having the first arm portion 66a received in the concavely curved cam lobe portion 64a of the lock control cam member 64. The lift member 198 is thus allowed to lower with respect to the base plate 10 by the weight thereof and causes the swivel rod 194 to turn into the initial angular position about the center axis thereof. The second arm portion 66b of the locking lever 66 is now disengaged from the lug member 202 on the swivel rod 194 of the disc cleaning mechanism 172 and allows the rockable bracket member 176 to turn downwardly with respect to the carriage plate 84 and accordingly to the disc D on the turntable 28. The brushing body 182 and the drive roller 188 are thus moved downwardly away from the lower face of the disc D. The driven gear 56 is now turned into the angular position having its plain or gearless peripheral portion 56a directed toward the drive gear 54 and permits the stem portion 30 of the turntable 28 to turn independently of the automatic arm drive mechanism 52. A playback operation is now started with the pickup arm 44 positioned below the lower face of the disc D which is held in a suspended state by the disc and drive support structure 14.

Throughout the playback operation, the solenoid-operated lever actuating unit 154 of the locking device 148 is kept energized and thus remains operative to maintain the locking engagement of the first bell-crank lever 150 with the pin 146 on the switch actuating bar 138. The main slider plate 76 is therefore held stationary with respect to the base plate 10 and, furthermore, the switch actuating bar 138 is held in the foremost limit position with respect to the slider plate 76 and has its rear end portion 138b held in contact with the outer face of the rear panel member 118 of the casing 12 as shown in FIG. 8B. The disc carrier mechanism 14 and accordingly the lower disc support unit carried thereon can therefore be held stationary within the casing 12 and are prevented with certainty from being withdrawn from the casing 12.

Upon completion of the playback operation, the actuating means 216 for the automatic arm drive mechanism 52 is made operative by suitable end-of-playback detector means (not shown) which is known per se or by any human intervention to stop the operation. This causes the automatic arm drive mechanism 52 to operate in such a manner as to move the pickup arm 44 back to the rest position thereof by the rotation of the driven gear 56 which is caused to engage the drive gear 54. By the rotation of the driven gear 56, the disc cleaner mechanism 172 is for a second time actuated into the operative condition having the brushing body 182 and the roller 188 brought into rolling contact with the lower face of the disc D and conducts the cleaning operation for the disc D.

The pickup arm 44 being moved back into the rest position thereof, the arm position detector circuit 214 ceases the supply of the output signal to the subsequent logic "OR" gate circuit 218 and causes the solenoid-operated lever actuating unit 154 to be de-energized with the flipflop circuit 212 already cleared. The result is that the plunger 154a of the solenoid-operated lever actuating unit 154 is caused to protrude by the biasing means incorporated in the actuating unit 154 per se and drives the first bell-crank lever 150 to turn from the second angular position back to the first angular position thereof about the center axis of the shaft 152, causing the hook portion 150c of the lever 150 to be disengaged from the pin 146 on the switch actuating bar 138. The switch actuating bar 138 and accordingly the main slider plate 76 supporting the bar 138 are thus allowed to withdraw from their respective foremost limit positions with respect to the base plate 10. Such a motion of the first bell-crank lever 150 is transmitted through the connecting rod 158 to the second bell-crank lever 160 and causes the second bell-crank lever 160 to turn also from the second angular position back to the first angular position thereof about the center axis of the shaft 162 by the force of the spring 170. The hook portion 160c of the second bell-crank lever 160 is thus for a second time brought into locking engagement with the pin 168 on the pickup arm 44 and locks the pickup arm 44 in the rest position thereof.

What is claimed is:

1. A disc player apparatus comprising
   a base plate,
   a plurality of support members upstanding from the base plate,
   elastic support elements respectively mounted on the support members,
   a disc and drive support structure including a turntable for holding thereto a disc to be played back, the support structure being supported in weight transmitting relationship on said support members through said elastic support elements,
   a carriage plate movable into and out of a position below said support structure, and
   a lower disc support unit movable with said carriage plate and including an elastic support element, the lower disc support unit being supported on said carriage plate through said elastic support element of the unit.

2. A disc player apparatus as set forth in claim 1, in which the turntable of said disc and drive support structure is positioned to have a lower face for receiving thereon the disc to be played back and in which said lower disc support unit comprises a spindle support member vertically movable through an opening formed in said carriage plate, a spindle having a vertical axis therethrough and rotatable on said spindle support member about said axis, and a disc support member secured to said spindle and having an upper face for supporting thereon the disc to be played back, said elastic support element of the disc support unit intervening between said spindle support member and said carriage plate.

3. A disc player apparatus as set forth in claim 1 or 2, in which said carriage plate forms part of a disc carrier mechanism which further comprises a main slider plate slidable on said base plate in disc loading and unloading directions which are opposite to each other, an auxiliary slider plate slidable on said main slider plate in directions substantially parallel with said disc loading and unloading directions and link members interconnecting said auxiliary slider plate and said carriage plate and thereby constituting a parallel motion structure in which the carriage plate is positioned and movable above and substantially in parallel with the auxiliary slider plate, said main slider plate and saic auxiliary slider plate being movable with respect to said base plate into and out of predetermined limit positions in which said lower disc support unit is vertically movable into and out of a predetermined upper position operative to have received between said turntable and said disc support member the disc to be played back.

4. A disc player apparatus as set forth in claim 3, further comprising guide means for guiding said disc support unit into said upper position thereof when the main and auxiliary slider plates are being moved into the respective predetermined limit positions thereof, said guide means comprising a roller rotatable about an axis fixed with respect to said carriage plate and substantially perpendicular to said disc loading and unloading directions, and a ramp member fixedly positioned to be engageable with said roller when main and auxiliary slider plates are being moved closer to the respective predetermined limit positions thereof, said ramp member having a surface portion slanting upwardly and forwardly away from said roller.

5. A disc player apparatus as set forth in claim 3, in which said disc carrier mechanism further comprises velocity multiplier means connected between said main and auxiliary slider plates and operative to cause said auxiliary slider plate to move at a velocity higher than the velocity of movement of the main slider plate when the main slider plate is moved in each of said disc loading and unloading directions with respect to said base plate.

6. A disc player apparatus as set in claim 5, in which said velocity multiplier means comprises at least four pulleys each rotatable about an axis substantially perpendicular to said disc loading and unloading directions and a closed loop of flexible line passed on said pulleys, the pulleys being positioned on said main slider plate so that said closed loop has a pair of straight travelling path portions substantially parallel with said disc loading and unloading directions, said line being anchored to said base plate at a point along one of said straight travelling path portions and to said auxiliary slider plate at a point along the other of said travelling path portions.

7. A disc player apparatus as set forth in claim 1 or 2, further comprising a pickup arm pivotally movable about a vertical axis fixed with respect to said base plate into and out of a predetermined rest position with respect to said base plate, an arm drive mechanism operative to drive said pickup arm into and out of said rest position thereof, electric actuating means for actuating said drive mechanism, switch means for providing electrical connection between said actuating means and a power source, and a switch actuating mechanism for operating said switch means to open and close, said switch actuating mechanism comprising a switch actuating bar supported on said main slider plate and movable a predetermined distance with respect to the main slider plate between a predetermined limit position engageable with said switch means, said switch actuating bar being operative to close said switch means when said main slider plate is in the predetermined limit position thereof with respect to said base plate and concurrently the switch actuating bar is in the predetermined limit position thereof with respect to the main slider plate.

8. A disc player apparatus as set forth in claim 7, in which said switch actuating mechanism further comprises biasing means urging said switch actuating bar to move away from said predetermined limit position thereof with respect to said main slider plate in a direction substantially parallel with said disc loading and unloading directions.

9. A disc player apparatus as set forth in claim 7 further comprising turntable drive means supported on said disc and drive support structure and electrically connected to said switch means, and a locking device comprising a lock control cam member rotatable about an axis fixed with respect said carriage plate, cam drive means for providing driving connection from said turntable drive means to said lock control cam member for driving the cam member to turn about the axis thereof, electric actuating means for electrically actuating said cam drive means and a locking lever held in slidable engagement with said lock control cam member.

10. A disc player apparatus as set forth in claim 9, in which said locking device further comprises a first lever rotatable about an axis fixed with respect to said base plate into and out of a predetermined angular position engageable with said switch actuating bar and operative to lock the switch actuating bar in said predetermined limit position thereof, a second lever rotatable about an axis fixed with respect to said base plate into and out of a predetermined angular position engageable with said pickup arm and operative to lock the pickup arm in said rest position thereof, and a connecting member interconnecting said first lever and said second lever together for causing one of the first and second levers to assume the predetermined angular position thereof when the other of the levers is out of the predetermined angular position thereof.

11. A disc player apparatus as set forth in claim 10, in which said locking device further comprising an electrically operated lever actuating unit including a movable member operatively connected to one of said first and second levers for driving said one of the levers into and out of the predetermined angular position thereof when electrically actuated.

12. A disc player apparatus as set forth in claim 11, further comprising a control circuit for connection between said power source and each of said turntable drive means, said electrically operated lever actuating unit and said electric actuating means, said control circuit comprising an arm position detector circuit operative to detect motion of said pickup arm into and out of said rest position thereof, and a bistable memory circuit having a first state responsive to closing of said switch means and a second state responsive to an output signal from said arm position detector circuit.

13. A disc player apparatus as set forth in claim 12, in which said memory circuit has a first input terminal connected to said power source across said switch means for being turned into said first state thereof and a second input terminal connected to said arm position detector circuit for being turned into said second state thereof, and an output terminal connected to said electric control means.

14. A disc player apparatus as set forth in claim 13, in which said control circuit further comprises a two-input logic "OR" gate circuit having one input terminal connected to said memory circuit and the other input terminal connected to said arm position detector circuit, the output terminal of the "OR" gate circuit being electrically connected to said lever actuating unit.

15. A disc player apparatus as set forth in claim 9, further comprising a disc cleaning mechanism comprising a bracket member rotatable about a substantially horizontal axis fixed with respect to said carriage plate, a brushing body rotatable about an axis turntable about the axis of rotation of the bracket member, the bracket member being rotatable with respect to said carriage plate into and out of a position close to the lower face of said turntable when said lower disc support unit is held in said predetermined upper position thereof, and a roller supported on said bracket member and rotatable about an axis substantially parallel with the axis of rotation of said brushing body, said roller being held in driving engagement with said brushing body and being held proximity to the lower face of said turntable when said lower disc support unit is held in said predetermined upper position thereof.

16. A disc player apparatus as set forth in claim 15, in which said roller constitutes a first roller and in which said disc cleaning mechanism further comprising a second roller which is held in rollable contact with the first roller and which is rotatable with said brushing body.

17. A disc player apparatus as set forth in claim 8 further comprising turntable drive means supported on said disc and drive support structure and electrically connected to said switch means, and a locking device comprising a lock control cam member rotatable about an axis fixed with respect said carriage plate, cam drive means for providing driving connection from said turntable drive means to said lock control cam member for driving the cam member to turn about the axis thereof, electric actuating means for electrically actuating said cam drive means and a locking level held in slidable engagement with said lock control cam member.

* * * * *